(12) United States Patent
Zhao et al.

(10) Patent No.: US 9,944,528 B2
(45) Date of Patent: Apr. 17, 2018

(54) CARBON NANOSTRUCTURE SYNTHESIS (71) Applicants: Guang-Lin Zhao, Baton Rouge, LA (US); Feng Gao, Baton Rouge, LA (US); Zhou Wang, Clifton, VA (US)

(72) Inventors: Guang-Lin Zhao, Baton Rouge, LA (US); Feng Gao, Baton Rouge, LA (US); Zhou Wang, Clifton, VA (US)

(73) Assignees: Southern University, Baton Rouge, LA (US); A&M College, Baton Rouge, LA (US)

( * ) Notice: Subject to any disclaimer, the term of this patent is extended or adjusted under 35 U.S.C. 154(b) by 0 days.

(21) Appl. No.: 15/159,228

(22) Filed: May 19, 2016

(65) Prior Publication Data
US 2016/0340192 A1  Nov. 24, 2016

Related U.S. Application Data

(60) Provisional application No. 62/164,507, filed on May 20, 2015.

(51) Int. Cl.
  *C01B 31/02* (2006.01)
  *C01B 32/15* (2017.01)
  *C01B 32/162* (2017.01)
  *B82Y 40/00* (2011.01)

(52) U.S. Cl.
  CPC .......... *C01B 31/0233* (2013.01); *C01B 32/15* (2017.08); *C01B 32/162* (2017.08); *B82Y 40/00* (2013.01); *Y10S 977/742* (2013.01); *Y10S 977/842* (2013.01)

(58) Field of Classification Search
  CPC ............ C01B 31/0226; C01B 31/0233; C01B 31/0446
  See application file for complete search history.

(56) References Cited

U.S. PATENT DOCUMENTS 7,776,777 B2 * 8/2010 Kim ...................... B01J 21/185
                                                    427/249.3

OTHER PUBLICATIONS

Zhao, Xueyan, et al. "Cellulosic carbon fibers with branching carbon nanotubes for enhanced electrochemical activities for bioprocessing applications." ACS applied materials & interfaces 5.18 (2013): 8853-8856.*

(Continued)

*Primary Examiner* — Richard M Rump
(74) *Attorney, Agent, or Firm* — John B. Edel; Edel Patents LLC (57) ABSTRACT

Methods of making carbon nanostructures are disclosed with including examples having heat treatment of a mixture having a fibrous organic reagent and a catalyst in the presence of a reducing agent for a time sufficient to produce a quantity of carbon nanostructures which may be nanotubes or other related structures. The reducing agent may be hydrogen, nitrogen or ammonia.

16 Claims, 4 Drawing Sheets

(56) References Cited

OTHER PUBLICATIONS

Hu, Hui, et al. "Nitric acid purification of single-walled carbon nanotubes." The Journal of Physical Chemistry B 107.50 (2003): 13838-13842.*

Liu, Huan, et al. "The preparation of silver nanoparticles/carbon nanofibers as catalyst in the styrene epoxidation." Colloids and Surfaces A: Physicochemical and Engineering Aspects 448 (2014): 154-159.*

"Chemical vapor deposition" from https://en.wikipedia.org/wiki/Chemical_vapor_deposition captured May 2016.

Qinglin Wu, Copper/Carbon Core Shell Nanoparticles As Additive for Natural Fiber/Wood Plastic Blends, BioResources, 7(3), 3213-3222, 2012.

* cited by examiner

CARBON NANOSTRUCTURE SYNTHESIS

This application claims the benefit of provisional application No. 62/164,507 filed on May 20, 2015 and entitled Synthesis of Carbon Nanotubes and Nanoparticles from Carbon Containing Fibers.

This invention was made with government support under grant numbers FA9550-09-1-0367 and FA9550-11-1-0330 awarded by Air Force Office of Scientific Research of the United States Department of Defense, grant number W911NF-15-1-0483 awarded by the Army Research Office of the United States Department of Defense and by grant numbers EPS-1003897 and NSF92010-15-RII-SUBR awarded by the National Science Foundation. The government has certain rights in the invention.

Carbon nanostructures described herein may be used in manufacturing a large variety of items and certain methods disclosed herein may be used to prepare carbon nanostructures in an economical way.

DETAILED DESCRIPTION

The prefix "nano," as used in the term "nanostructure" and other similar usages refers to a structures or materials which possesses components having at least one characteristic dimension that is about 500 nm or smaller. The term "carbon nanotube" refers to allotropes of carbon with a cylindrical nanostructure, which has an average diameter in the range of from about 1 nm to several hundred nm and an average length in the range of from 20 nm and up. Carbon nanotube(s) are sometimes referred to herein as "CNT(s)" for the sake of brevity. The term "single-wall carbon nanotube" refers to cylindrically shaped thin sheet of carbon atoms having a wall consisting essentially of a single layer of carbon atoms. The term "multi-wall carbon nanotube" refers to a nanotube composed of more than one concentric tubes. The term "carbon nanoparticle" refers to particle-like carbon containing materials having more than one characteristic length scales that are about 500 nanometers or less. Carbon nanoparticle(s) are sometimes referred to herein as "CNP(s)" for brevity. The term "fiber" refers to a slender, elongated, threadlike object or structure, which has a length L much greater than its diameter D, wherein D is the diameter of the circle in which the cross section of the fiber is inscribed. The term "carbon containing fibers" as used herein refers to fiber materials comprised of carbon and other elements in their compositions. These carbon containing fibers may include natural fibers such as cotton fibers and others and synthetic fibers such as polyacrylonitrile (PAN) polymer fibers and others. The phrase "carbon nanofiber" refers to a carbon fiber whose diameter may be about 1000 nm or less. Certain structures described herein may be referred to as generically carbon nanofibers regardless of whether or not they are hollow if they meet that criteria. A "functionalized" carbon nanostructure is defined as a carbon nanostructure that has bonded atoms or chemical groups to its surface. A "doped carbon nanostructure" is defined as a carbon nanostructure that has the presence of atoms of an element other than carbon within the carbon nanostructure lattice.

The following disclosure describes methods of large scale production of CNTs/CNPs materials, which refers to the production of amounts of CNTs/CNPs from grams per job production and up.

In some embodiments, the carbon nanotubes may have a form chosen from hollow multi-wall carbon nanotubes, bamboo multi-wall carbon nanotubes, carbon nanohorns, or other carbon nanotube species. Nonlimiting examples of carbon containing fibers that may be used for the synthesis of carbon nanotubes and carbon nanoparticles may be chosen from single or multi-component carbon containing fibers including natural cellulose fibers (such as cotton fibers, linen fibers, wood fibers, bamboo fibers, and others), manufactured cellulose fibers (such as rayon fibers, viscose fibers, and others), polymer fibers (such as polyacrylonitrile (PAN) fibers, polyamide nylon fibers, polyethylene terephthalate (PET) or polybutylene terephthalate (PBT) polyester fibers, phenol-formaldehyde (PF) fibers, polyvinyl chloride (PVC) vinyon fibers, polyolefins olefin fibers, acrylic polyester fibers, aromatic polyamids fibers, polyethylene (PE) fibers, elastomers fibers, polyurethane fibers, elastolefin fibers, and others), and other carbon containing fibers.

Nonlimiting examples of catalyst metals that may be used for the synthesis of carbon nanotubes and carbon nanoparticles may be chosen from transition metals (such as iron, nickel, cobalt, and others) and their salts, oxides, hydrides, hydroxides, or any alloys thereof. Unless otherwise indicated, all numbers expressing quantities of ingredients, reaction conditions, and so forth used in the specification and examples are to be understood as being modified in all instances by the term "about."

Carbon precursors that may be used for the synthesis of carbon nanotubes and carbon nanoparticles may be chosen from single or multi-component carbon containing fibers such as natural cellulose cotton fibers.

Potential catalyst compositions that may be used with the methods taught herein may be selected from catalyst compositions routinely used in other CNT/CNP synthesis methods such as chemical vapor deposition processes. The function of the catalyst in the CNT/CNP growth process is to decompose the carbon precursors and aid the growth of ordered carbon. The metal catalyst may be selected from transition metals (such as iron, nickel, cobalt, and others) and mixtures thereof. The metal catalyst may be iron, cobalt, nickel, copper, molybdenum, or a mixture thereof. Metal salts containing catalyst metal ions may be used. Thus, the metal salt may contains the metal ion and a counter ion, where the counter ion may be nitrate, nitride, perchlorate, sulfate, sulfide, acetate, halide, oxide, such as methoxide or ethoxide, acetylacetonate, and the like. For example, the metal salt may be iron acetate ($FeAc_2$), nickel acetate ($NiAc_2$), palladium acetate ($PdAc_2$), molybdenum acetate ($MoAc_3$), and the like, and combinations hereof.

The catalysts may be prepared by a solution of the corresponding metal salt in ethanol or other solvents. The metal salt is dissolved in a solvent to give a solution, a suspension, or a dispersion. The solvent may be an organic solvent, and may be one in which the chosen metal salt is relatively soluble and stable, and where the solvent has a high enough vapor pressure that it may be easily evaporated under experimental conditions. The solvent may be ethanol, ether, and the like.

The relative amounts of metal salt and passivating solvent are factors in controlling the size of nanoparticles produced. A wide range of molar ratios, here referring to total moles of metal salt per mole of passivating solvent, may be used for forming the metal nanoparticles. The passivating solvent and the metal salt reaction solution may be mixed to give a homogeneous catalyst solution, suspension, or dispersion. The catalyst solution may be mixed using standard laboratory stirrers, mixtures, sonicators, and the like, optionally with heating. Carbon containing fibers such as natural cellulose cotton fibers may be soaked into the catalyst solution and then dried. The treated carbon containing fibers such as natural cellulose cotton fibers with the metal catalyst solution thus obtained may be subjected to thermal decomposition in order to form the metal nanoparticles on carbon fibers.

The particle size and diameter of the metal nanoparticles may be controlled by using the appropriate concentration of metal in the solvent and by controlling the thermal decomposition temperature.

The reaction furnace may be selected from commercially available reaction furnaces having a reactor capable of supporting at least one temperature zone and having an airtight reaction chamber where a reaction gas or gas mixture is provided into reaction chamber, and gas leak to reaction chamber or from reaction chamber may be prevented. An evacuating system connected to the reactor for evacuating gases from the chamber may be needed.

Firstly, carbon containing fibers such as natural cotton fibers may be pretreated in a diluted acid solution to remove dirt and other impurities. The pretreated carbon containing fibers such as natural cellulose cotton fibers may be soaked into the catalysts solution and then stirred at elevated temperature until the solvent was evaporated. The materials may then be put in the vacuum oven and completely dried at an elevated temperature. By a heat treatment at temperature higher than 700° C. in hydrogen or inert gas environment for several minutes to hours, the treated cotton fibers may be converted to carbon nanotubes/nanoparticles (CNT/CNP) composite through a catalytic thermolysis. To remove the redundant metallic catalyst compounds, the obtained CNT/CNP composite may be purified in diluted acid solution. Finally, the materials may be heat-treated again under the same conditions as used for the first heat treatment. The morphology of the obtained CNT/CNP materials may be characterized by scanning electron microscopy. The microstructure of the obtained CNT/CNP materials may be characterized by transition electron microscopy (TEM).

As that term is used herein "organic" is used to describe compositions containing carbon atoms.

Methods described herein may also be used to produce functionalized carbon nanostructures. The treatment of carbon containing fibers used for synthesizing functionalized carbon nanostructures may be the same as above. For functionalization, the treated carbon containing fibers is heated at temperature higher than 700° C. in a gas environment with functionalization atoms or ions. After the heat treatment, the remaining materials may be converted to functionalized carbon nanostructures, which may be purified in diluted acid solution for removing redundant metallic catalyst compounds. Finally, the functionalized carbon nanomaterials may be heat-treated again under the same conditions as used for the first heat treatment. The properties of the functionalized carbon nanomaterials may be characterized by electrochemical measurements or other methods.

Example 1: Synthesis of Long Carbon Nanotubes

First, 3.0 g natural cotton fibers were pretreated in 0.5M $HNO_3$ at 70° C. for 3 hours (h). A catalyst solution of 1.0 g iron acetate and 1.0 g cyanamide in ethanol was stirred for 3 h at 60° C. The pretreated cotton was soaked into the catalyst solution and stirred at 60° C. until the ethanol was evaporated. Then the cotton treated with catalyst solution was dried at 50° C. in the vacuum oven for several hours. By a heat treatment at 1200° C. for 1 h in hydrogen environment, the treated cotton fibers are converted to Fe/carbon nanotubes/nanoparticles (Fe/CNT/CNP) composite through a catalytic thermolysis. To remove the redundant metallic iron and iron compounds, the obtained Fe/CNT/CNP composite was purified in 0.5 M $HNO_3$ at 70° C. overnight. Finally, the sample was heat-treated again under the same conditions as used for the first heat treatment.

Figure 1A:
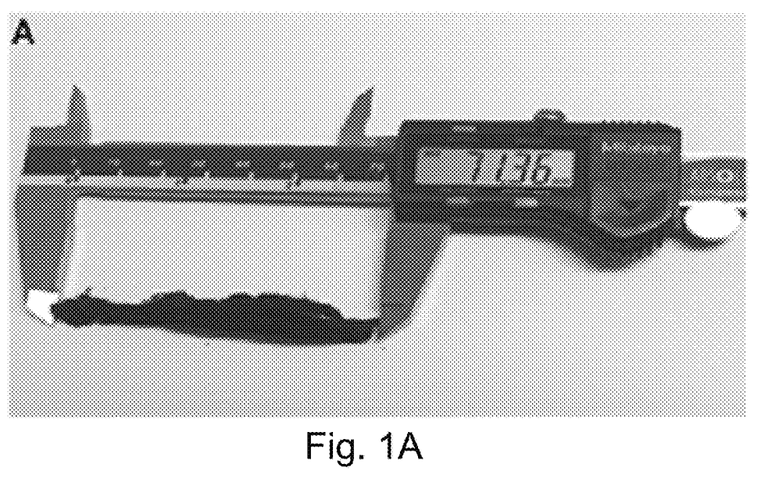
FIG. 1A shows a macroscopic mass containing nanostructures.
Figure 1B:
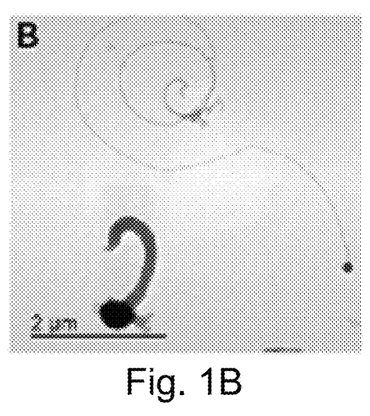
FIG. 1B shows a magnified view of carbon nanostructures.
Figure 1C:
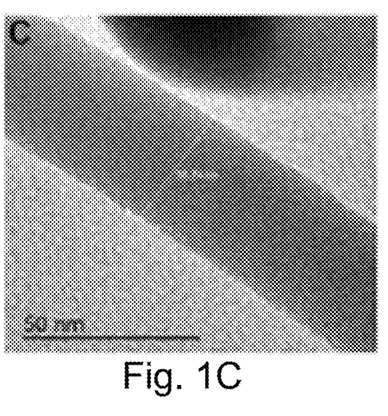
FIG. 1C shows a magnified view of carbon nanostructures.
Figure 1D:
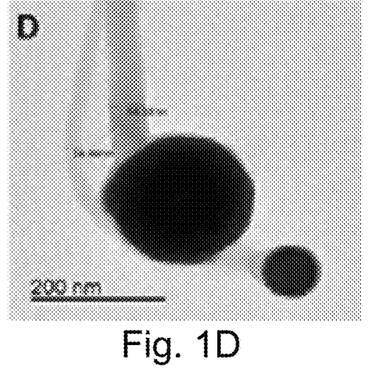
FIG. 1D shows a magnified view of carbon nanostructures.
Figure 1E:
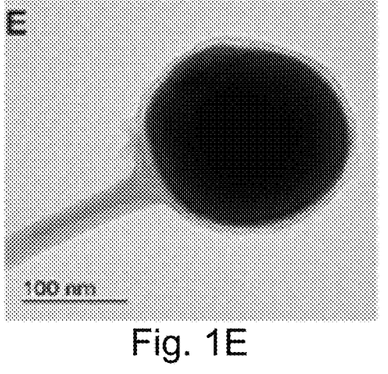
FIG. 1E shows a magnified view of carbon nanostructures.

FIG. 1A shows the photograph of a piece of carbon nanotube composite bundle grown from the pretreated natural cotton fibers. The photo shows that the CNT composite bundle synthesized by the new method may reach macroscopic size (as long as ~71 mm) The microstructure of the samples may be characterized by TEM. FIGS. 1B-1E show the TEM images of the produced sample from natural cotton fibers in hydrogen environment at 1200° C. FIG. 1B shows the produced CNTs having relatively long length, in comparison with other samples produced at relatively lower temperature or in other gas environment. The scale bars in FIG. 1B is 2 µm. In this experiment, the produced sample from the natural cotton fibers contained many long CNTs, which could reach to 20 µm or longer. Long CNTs may sometimes be referred to as "L-CNT(s)" for the sake of brevity. The dark spheres shown in FIG. 1B are catalyst nanoparticles which play a role for the formation of the L-CNTs. Not wishing to be be bound by theory, each single CNT may start from an isolated catalytic nanoparticle, forming a curved L-CNT structure. FIG. 1C shows the TEM image of a magnified part of a segment of the CNT, and the scale bar is 50 nm. The wall of the L-CNT may be quite smooth with a diameter of about 38 nm, which are multi-wall carbon nanotubes. Multi-wall carbon nanotubes are sometimes referred to herein as "MWCNT(s)" for brevity. FIG. 1D displays two separate L-CNTs with diameters of about 56.3 nm and 24.5 nm, respectively; the diameters of the catalytic nanoparticles from which the two L-CNTs grown were about 222.53 nm and 86.2 nm, respectively. Generally, the size (diameter) of the L-CNT depends on the size of the catalytic nanoparticle: larger catalytic nanoparticles produce thicker L-CNTs. The image in FIG. 1E shows the catalytic nanoparticle actually possessing a core-shell structure, which mainly composes of three parts from inside to outside: a dark core, a relatively lighter intermediate layer, and a gray shell, respectively. The dark core actually is a Fe particle, which works as catalytic center for the growth of the L-CNT. The intermediate layer of the nanoparticle, which looks lighter than the Fe core, is a mixture of Fe and C. The major component of the outside shell of the nanoparticle is carbon. FIG. 1E could also shed some light on the growth mechanism of the L-CNT, which may be different from those CNTs grown from chemical vapor deposition or other methods. In the chemical vapor deposition grown CNTs, Fe catalyst nanoparticle is usually wrapped inside CNT at one-end. The size of Fe catalyst nanoparticle strongly control the CNT diameter. A correlation between the size of the Fe catalyst particles and the diameter of the CNTs grown from the chemical vapor deposition method is often observed. For instance, Cheung et al. reported that Fe nanoparticles of average diameters $d_{NP}$ of 3, 9, and 13 nm produced MWCNTs with average diameters $d_{NT}$ of 3, 7, and 12 nm, respectively, which corresponds to a ratio $d_{NT}/d_{NP}$ close to 1. Schaffel et al. obtained a similar ratio $d_{NT}/d_{NP}$ using Fe particles of 3-18 nm. Chen et al. also reported that the diameter distribution of single wall carbon nanotubes was correlated with the size of the used $SiO_2$ particles with a tube particle ratio $(d_{NT}/d_{NP})$~0.8-0.9. The L-CNT outer diameters (OD) were found to be much smaller than the size of Fe nanoparticles, $d_{NT}/d_{NP}$~0.25-0.28. There is a tail of the Fe nanoparticle, on which a CNT grown and wrapped around it, as shown in FIG. 1F. The CNT diameters correlate with the catalytic sizes of iron nanoparticles, but not in a sample way. Another possibility is that the Fe nanoparticles may be in a soft molten state during the L-CNT growth process at 1200° C. Fe nanoparticles could be in an elongated shape and the ratio $d_{NT}/d_{NP}$ might be more close to 1 during the CNT growth process. During the cooling down process, the Fe nanoparticles might grow larger and tend to have a nearly spherical shape, due to their surface energy effect. Tube particle ratios $(d_{NT}/d_{NP})$ produced by the present methods may, for example, be 0.25 with certain examples falling between 0.7 and 0.05 and a subset of those examples falling between 0.48 and 0.15.

Example 2: Synthesis of Bamboo Multi-Wall Carbon Nanotubes

Methods described herein may also be used to produce bamboo MWCNTs. The pretreatment of cotton used for synthesizing bamboo MWCNTs were the same as those used for producing L-CNTs. The production of bamboo MWCNTs may be due to nitrogen functionalization. The pretreated cotton was heated in nitrogen environment at a temperature ranging from 850° C. to 1100° C. converting the pretreated cotton into nitrogen functionalized Fe/carbon nanotubes/nanoparticles (N—Fe/CNTs/CNPs) composite, which was then preleached in 0.5 M $HNO_3$ at 70° C. overnight to remove the redundant metallic iron and iron compounds. Finally, the N—Fe/CNTs/CNPs composite was heat-treated again under the same conditions as used for the first heat treatment in nitrogen gas environment at a temperature ranging from 850° C. to 1100° C.

Figure 2A:
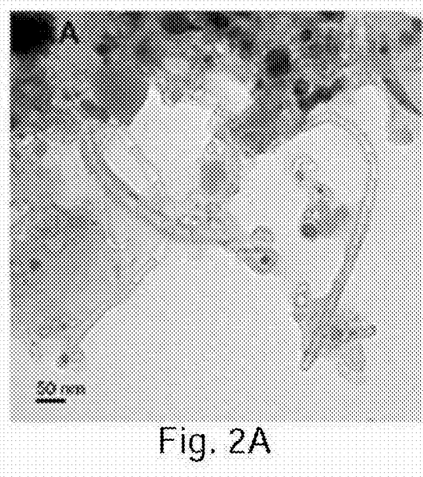
FIG. 2A shows a magnified view of carbon nanostructures.
Figure 2B:
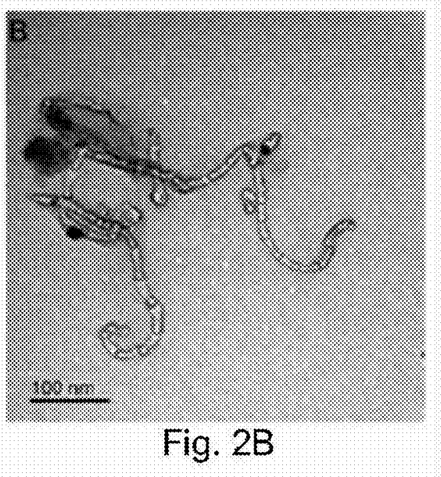
FIG. 2B shows a magnified view of carbon nanostructures.
Figure 2C:
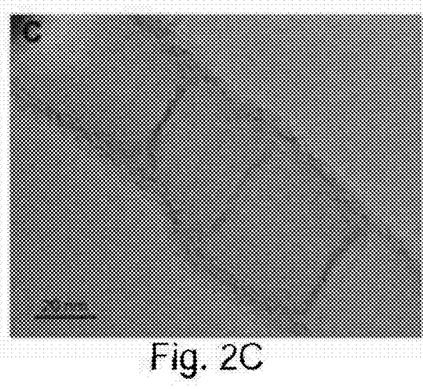
FIG. 2C shows a magnified view of carbon nanostructures.
Figure 2D:
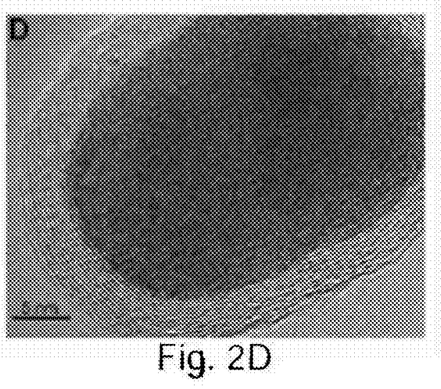
FIG. 2D shows a magnified view of carbon nanostructures.

FIG. 2A and FIG. 2B show the TEM images of the sample synthesized from pretreated natural cotton fibers under nitrogen environment at a heat treatment temperature of 950° C. The TEM images show typical bamboo-like CNTs. The diameters of the bamboo-like CNTs were from ~20 nm to ~30 nm, and the segment lengths of the bamboo-like structure were about 20-50 nm. FIG. 2C shows the high resolution TEM images of the bamboo CNTs. The scale bar is 20 nm. The high resolution TEM images indicate that the as-synthesized bamboo CNTs were multi-wall CNTs. FIG. 2D shows the core-shell structure of the catalytic nanoparticle from which the bamboo-CNTs yields. The dark core is an Fe nanoparticle which performs as catalyst in the growth of the bamboo-CNTs. Bamboo-CNTs were also synthesized from pretreated natural carbon fibers in nitrogen environment at various annealing temperatures from 850° C. to 1000° C. Typical bamboo-like CNTs were observed in all the obtained samples.

Example 3: Synthesis of Nitrogen Doped Carbon Nanostructures in Ammonia Gas Environment Embodiments described herein may also be used to produce heavily nitrogen doped carbon nanostructures. The pretreatment of cotton used for synthesizing nitrogen doped carbon nanostructures was the same as the one used for producing bamboo MWCNTs. To achieve heavy nitrogen doping, the pretreated cotton was heated in ammonia gas environment at a temperature ranging from 850° C. to 1100° C. converting the pretreated cotton into nitrogen doped carbon nanomaterial, which were then preleached in 0.5 M nitric acid ($HNO_3$) or sulfuric acid ($H_2SO_4$) at 70° C. overnight to remove redundant metallic iron and iron compounds. Finally, the material was heat-treated again under the same conditions as used for the first heat treatment in ammonia gas environment at a temperature ranging from 850° C. to 1100° C.

Figure 3A:
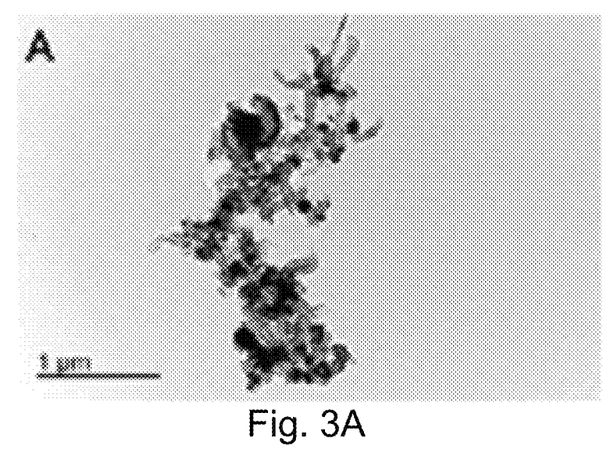
FIG. 3A shows a magnified view of carbon nanostructures.
Figure 3B:
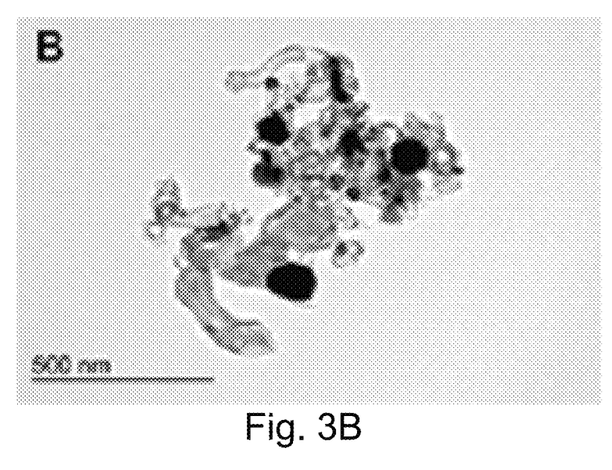
FIG. 3B shows a magnified view of carbon nanostructures.

FIGS. 3A and 3B show the TEM images of the heavily nitrogen doped carbon nanostructures from pretreated natural cotton fibers in an ammonia gas environment at a heat treatment temperature of 950° C. The materials show quite complex structures due to nitrogen functionalization, including bamboo MWCNTs, graphene nanoplatetlets, and carbon nanoparticles. The bamboo MWCNTs had irregular shape with relatively large diameters ranging from about 30 to 100 nm. The sizes of the graphene nanoplatetlets were about 90 to 120 nm. The sizes of the nanoparticles ranged from about 20 to 60 nm.

Example 4: Electrochemical Measurements of the Electrocatalytic Properties of Nitrogen Doped Carbon Nanostructures The heavily nitrogen doped carbon nanostructures may be used as new electrocatalysts for oxygen reduction reaction and other catalytic applications. The electrocatalytic properties of the nitrogen doped carbon nanostructures may be measured by electrochemical tests. Rotating ring disk electrode catalyst inks were prepared by dispersing 5 mg of catalyst in 50 mg of 5 wt % sulfonated tetrafluoroethylene based fluoropolymer-copolymer sold as Nafion in alcohol solution available from Aldrich and 500 mg of methanol. The solution was sonicated for 30 minutes and stirred overnight. Electrochemical measurements were performed on an electrochemical workstation (CH Instruments 760 D) at a rotation speed of 1600 rpm. The electrolyte was 0.1 M $HClO_4$ contained within a three electrode cell. The reference electrode was $Hg/HgSO_4$ filled with 0.5 M $H_2SO_4$ and the counter electrode was a gold wire to avoid platinum contamination. The working electrode was a glassy carbon (GC) ring-disk electrode with an area of 0.2472 $cm^2$ and a Pt ring available from Pine Instruments under model no. AFE7R9DCPT. Prior to use, the GC electrode was polished with 0.05 μm alumina and thoroughly rinsed with deionized water. Then 15 μL of catalyst ink was pipetted onto the GC and allowed to dry in air, which give catalyst loadings of about 400 μg $cm^{-2}$. Oxygen reduction reaction experiments were conducted at room temperature and atmospheric pressure using ultra-high-purity gasses. Capacitive background currents were recorded first in Ar-purged electrolyte using the potential sweep from 0 V to 1.0 V (vs. RHE) at a scan rate of 10 mV s$^{-1}$. The electrolyte was then purged with $O_2$ followed by cathodic linear sweep voltammetry at 10 mV s$^{-1}$ to test oxygen reduction reaction activity. The ring potential was set at 1.24 V (vs. RHE).

Figure 4:
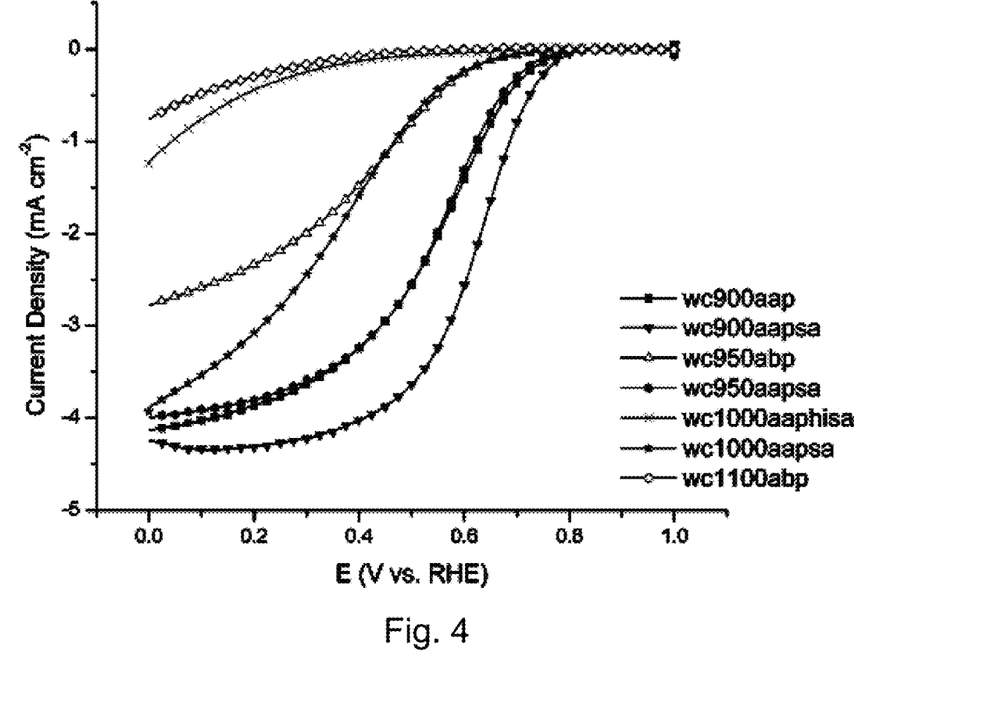
FIG. 4 shows linear sweep voltammetry data for a variety of samples.

Electrocatalytic properties of the as-synthesized nitrogen doped carbon nanomaterials were obtained at different annealing temperatures and conditions towards oxygen reduction reaction were measured by rotating ring disk electrode tests. The measurements were performed in oxygen saturated 0.1 M $HClO_4$ solution at 1600 RPM with catalyst loading ~1.0 mg/cm$^2$. The obtained linear sweep voltammetries (LSV) data for several samples are shown in FIG. 4. Table 1 lists the synthesis conditions for the samples discussed in FIG. 4.

TABLE 1

Synthesis conditions for different samples of nitrogen doped carbon nanomaterials.

| Sample | Annealing temperature (° C.) | Cotton:Iron acetate:Cynamide | Gas for heat treatment | Acid for purification | Second annealing |
|---|---|---|---|---|---|
| wc900aap | 900 | 1:1:3.5 | $NH_3$ | 0.5 mol $HNO_3$ | yes |
| wc900aap5a | 900 | 1:1:3.5 | $NH_3$ | 0.5 mol $H_2SO_4$ | yes |
| wc950abp | 950 | 1:1:3.5 | $NH_3$ | No | no |
| wc950aap5a | 950 | 1:1:3.5 | $NH_3$ | 0.5 mol $HNO_3$ | yes |
| wc1000aaphisa | 1000 | 1:0.5:3.5 | $NH_3$ | 0.5 mol $HNO_3$ | yes |
| wc1000aapsa | 1000 | 1:1:3.5 | $NH_3$ | 0.5 mol $HNO_3$ | yes |
| wc1100abpnc | 1100 | 1:1:0 | $NH_3$ | No | no |

FIG. 4 shows that the nitrogen doped carbon nano materials synthesized from pretreated natural cotton fibers at annealing temperatures of 900° C. and 950° C. showed pronounced catalytic performance. Compared to the measured data of different samples, the nitrogen doped carbon nanostructures synthesized at temperatures from 900° C. show a high performance towards oxygen reduction reaction.

Methods of making carbon nanostructures described herein may, for example, include providing a mixture comprising a reagent and a catalyst such that the reagent is fibrous and organic; providing a reducing agent; heat treating the mixture in the presence of the reducing agent such that the heat treatment may have a duration sufficient to produce a quantity of carbon nanostructures and such that the heat treatment occurs at a temperature greater than 700° C. and cooling the quantity of carbon nanostructures. In a related example, the method may include purifying a fibrous starting material thereby removing a non-carbon portion of the fibrous starting material from the fibrous starting material yielding the reagent. In a related example, the catalyst may be a metal based catalyst. In a related example, the method may include removing a separated portion of the catalyst from the quantity of carbon nanostructures. In a related example, the heat treating may have a duration of at least 3 minutes. In a related example, the method may include purifying a fibrous starting material thereby removing a non-carbon portion of the fibrous starting material from the fibrous starting material yielding the reagent and removing a separated portion of the catalyst from the quantity of carbon nanostructures; such that the catalyst comprises an element selected from iron, cobalt, and nickel and such that the heat treating has a duration of at least 3 minutes. In a related example, the method may include exposing the catalyst to the reagent wherein the exposing takes place in a solution. In a related example, the method may include subjecting the quantity of carbon nanostructures to an aqueous acid followed by drying the carbon nanostructures. In a related example, the reducing agent may be selected from hydrogen, ammonia and nitrogen. In a related example, the quantity of carbon nanostructures may include a portion of the catalyst embedded within the carbon nanostructures. In a related example, the reagent may make up at least 20 weight percent of the mixture and the heat treatment duration may be at least 3 minutes. In a related example, the reagent may be at least 50 weight % fiber. In a related example, the reagent may have a carbon mass fraction of at least 50 weight %. In a related example, the heat treatment may occur in a gas having less than 10 weight % oxygen. In a related example, the reagent may include plant matter.

Methods of making carbon nanostructures described herein may, for example, include providing a mixture comprising a reagent and a catalyst having a fibrous organic reagent; providing a reducing agent and heat treating the mixture in the presence of the reducing agent; such that the heat treatment has a heat treatment duration sufficient to produce a quantity of carbon nanostructures; the reducing agent is selected from hydrogen, ammonia and nitrogen; the quantity of carbon nanostructures comprises a portion of the catalyst embedded within the carbon nanostructures; the reagent makes up at least 20 weight percent of the mixture and the heat treatment duration is at least 3 minutes. In a related example, the method may include purifying a fibrous starting material thereby removing a non-carbon portion of the fibrous starting material from the fibrous starting material yielding the reagent and removing a separated portion of the catalyst from the quantity of carbon nanostructures; such that the catalyst comprises an element selected from iron, cobalt, and nickel and such that the heat treating has a duration of at least 3 minutes.

Methods of making carbon nanostructures described herein may, for example, include providing a mixture comprising a reagent and a catalyst wherein the reagent is fibrous and organic; providing a reducing agent and heat treating the mixture in the presence of the reducing agent; such that the heat treatment has a heat treatment duration sufficient to produce a quantity of carbon nanostructures; such that the reagent has a fiber content of at least 50 weight %; such that the reagent has a carbon mass fraction of at least 50 weight %; such that the heat treatment occurs in a gas having less than 10 weight % oxygen and such that the reagent comprises plant matter. In a related example, the reagent may comprise cellulose and the carbon nanostructures may comprise carbon nanotubes. In a related example, the method may include purifying a fibrous starting material in nitric acid thereby removing a non-carbon portion of the fibrous starting material from the fibrous starting material yielding the reagent; exposing the catalyst to the reagent wherein the exposing takes place in an iron acetate, cyanamide and ethanol solution; drying the reagent after the exposing of the catalyst to the reagent and removing a separated portion of the catalyst from the quantity of carbon nanostructures by way of treatment in nitric acid; such that the reducing agent is selected from hydrogen, ammonia and nitrogen; such that the catalyst comprises an element selected from iron, cobalt, and nickel; such that the heat treating has a duration of at least 3 minutes; such that the heat treating is at a temperature between 1100° C. and 1300° C. and such that the reagent comprises cotton.

Carbon mass fraction is determined by the elemental analysis of the mass fraction of carbon and is described herein as a fraction of the total composition in units of weight percent. Similarly, other mass fractions of the elemental components of various compositions may be expressed in units of weight percent. For example, reference to iron mass fraction would indicate a weight percent of copper as determined by elemental analysis of the mass fraction of carbon in the item or composition being evaluated. Unless otherwise indicated, percentages indicate weight percent.

Characterization of the structures described herein may continue beyond the filing of the present application and terms and phrases, such as nanotube, as used in the specification are intended to enhance the understanding of the disclosure. Accordingly, claims omitting such particular terms and phrases are not intended to be limited to those terms and phrases or the illustrative examples of the disclosure.

The above-described embodiments have a number of independently useful individual features that have particular utility when used in combination with one another including combinations of features from embodiments described separately. There are, of course, other alternate embodiments which are obvious from the foregoing descriptions, which are intended to be included within the scope of the present application.

What is claimed is:

1. A method of making carbon nanostructures comprising:
   a. providing a mixture comprising a reagent and a catalyst
      i. wherein the reagent is fibrous and
      ii. wherein the reagent is organic;
   b. providing a reducing agent;
   c. heat treating the mixture in the presence of the reducing agent
      i. wherein the heat treatment has a heat treatment duration sufficient to produce a quantity of carbon nanostructures and
      ii. wherein the heat treatment occurs at a heat treatment temperature greater than 700° C. and
   d. cooling the quantity of carbon nanostructures;
   e. wherein a majority of carbon in the quantity of carbon nanostructures is from the reagent and
   f. wherein the reagent comprises plant matter.

2. The method of claim 1 further comprising purifying a fibrous starting material thereby removing a non-carbon portion of the fibrous starting material from the fibrous starting material yielding the reagent.

3. The method of claim 1 wherein the catalyst is a metal based catalyst.

4. The method of claim 1 further comprising removing a separated portion of the catalyst from the quantity of carbon nanostructures.

5. The method of claim 1 wherein the heat treating has a duration of at least 3 minutes.

6. The method of claim 1 further comprising:
   a. purifying a fibrous starting material thereby removing a non-carbon portion of the fibrous starting material from the fibrous starting material yielding the reagent and
   b. removing a separated portion of the catalyst from the quantity of carbon nanostructures;
   c. wherein the catalyst comprises an element selected from iron, cobalt, and nickel and
   d. wherein the heat treating has a duration of at least 3 minutes.

7. The method of claim 1 further comprising exposing the catalyst to the reagent wherein the exposing takes place in a solution.

8. The method of claim 1 further comprising subjecting the quantity of carbon nanostructures to an aqueous acid followed by drying the carbon nanostructures.

9. The method of claim 1 wherein the reducing agent is selected from hydrogen, ammonia and nitrogen.

10. The method of claim 1 wherein the quantity of carbon nanostructures comprises a portion of the catalyst embedded within the carbon nano structures.

11. The method of claim 1 wherein the reagent makes up at least 20 weight percent of the mixture and wherein the heat treatment duration is at least 3 minutes.

12. The method of claim 1 wherein the reagent is at least 50 weight % fiber and wherein the carbon nanostructures comprise carbon nanotubes.

13. The method of claim 1 wherein the reagent has a carbon mass fraction of at least 50 weight %.

14. The method of claim 1 wherein the heat treatment occurs in a gas having less than 10 weight % oxygen.

15. A method of making carbon nanostructures comprising:
   a. providing a mixture comprising a reagent and a catalyst
      i. wherein the reagent is fibrous and
      ii. wherein the reagent is organic;
   b. providing a reducing agent and
   c. heat treating the mixture in the presence of the reducing agent;
   d. wherein the heat treatment has a heat treatment duration sufficient to produce a quantity of carbon nanostructures;
   e. wherein the reagent has a fiber content of at least 50 weight %;
   f. wherein the reagent has a carbon mass fraction of at least 50 weight %;
   g. wherein the heat treatment occurs in a gas having less than 10 weight % oxygen;
   h. wherein the reagent comprises plant matter;
   i. wherein a majority of carbon in the quantity of carbon nanostructures is from the reagent and
   j. wherein the reagent comprises cellulose and wherein the carbon nanostructures comprise carbon nanotubes.

16. The method of claim 15 further comprising:
   a. purifying a fibrous starting material in nitric acid thereby removing a non-carbon portion of the fibrous starting material from the fibrous starting material yielding the reagent;
   b. exposing the catalyst to the reagent wherein the exposing takes place in an iron acetate, cyanamide and ethanol solution;

c. drying the reagent after the exposing of the catalyst to the reagent and
d. removing a separated portion of the catalyst from the quantity of carbon nanostructures by way of treatment in nitric acid;
e. wherein the reducing agent is selected from hydrogen, ammonia and nitrogen;
f. wherein the catalyst comprises an element selected from iron, cobalt, and nickel;
g. wherein the heat treating has a duration of at least 3 minutes;
h. wherein the heat treating is at a temperature between 1100° C. and 1300° C. and
i. wherein the reagent comprises cotton.

* * * * *

UNITED STATES PATENT AND TRADEMARK OFFICE
CERTIFICATE OF CORRECTION

PATENT NO. : 9,944,528 B2  
APPLICATION NO. : 15/159228  
DATED : April 17, 2018  
INVENTOR(S) : Guang-Lin Zhao, Feng Gao and Zhou Wang It is certified that error appears in the above-identified patent and that said Letters Patent is hereby corrected as shown below:

On the Title Page

The lines reading "(73) Assignees: Southern University, Baton Rouge, LA (US); A&M College, Baton Rouge, LA (US)" should appear as follows:
--(73) Assignees: Southern University and A&M College, Baton Rouge, LA (US)--.

Signed and Sealed this
Tenth Day of July, 2018

Andrei Iancu
*Director of the United States Patent and Trademark Office*